United States Patent [19]
Malik et al.

[11] Patent Number: 5,832,503
[45] Date of Patent: Nov. 3, 1998

[54] METHOD AND APPARATUS FOR CONFIGURATION MANAGEMENT IN COMMUNICATIONS NETWORKS

[75] Inventors: Rajiv Malik; Steve Sycamore, both of Nashua, N.H.; Bill Tracy, Chelmsford, Mass.

[73] Assignee: Cabletron Systems, Inc., Rochester, N.H.

[21] Appl. No.: 394,143

[22] Filed: Feb. 24, 1995

[51] Int. Cl.⁶ .................................................. G06F 17/30
[52] U.S. Cl. .............. 707/104; 395/200.52; 395/185.03; 707/10
[58] Field of Search ................................. 395/615, 600, 395/161, 182.02, 51, 155, 755, 800, 326, 200, 148, 200.1, 357, 183.02, 610, 229, 200.52, 183.03; 364/491, 488, 182.02, 468.03, 551.01; 340/825.06; 371/20.1; 379/59; 370/60; 707/104, 10

[56] References Cited

U.S. PATENT DOCUMENTS

| | | | |
|---|---|---|---|
| 5,049,873 | 9/1991 | Robins et al. | 340/825.06 |
| 5,165,018 | 11/1992 | Simor | 395/200.52 |
| 5,175,800 | 12/1992 | Galis et al. | 395/51 |
| 5,193,152 | 3/1993 | Smith | 395/200 |
| 5,202,985 | 4/1993 | Goyal | 395/600 |
| 5,226,120 | 7/1993 | Brown et al. | 395/200 |
| 5,261,044 | 11/1993 | Dev et al. | 395/357 |
| 5,285,494 | 2/1994 | Sprecher et al. | 379/59 |
| 5,295,244 | 3/1994 | Dev et al. | 395/357 |
| 5,333,252 | 7/1994 | Brewer, III et al. | 395/148 |
| 5,337,320 | 8/1994 | Kung | 395/183.02 |
| 5,436,909 | 7/1995 | Dev et al. | 371/20.1 |
| 5,452,415 | 9/1995 | Hotka | 395/161 |
| 5,455,938 | 10/1995 | Ahmed | 364/488 |
| 5,471,399 | 11/1995 | Tanaka et al. | 364/491 |
| 5,483,468 | 1/1996 | Chen et al. | 364/551.01 |
| 5,483,631 | 1/1996 | Nagai et al. | 395/155 |
| 5,485,455 | 1/1996 | Dobbins et al. | 370/60 |
| 5,500,934 | 3/1996 | Austin et al. | 395/755 |
| 5,515,269 | 5/1996 | Willis et al. | 395/229 |
| 5,535,335 | 7/1996 | Cox et al. | 395/200.11 |
| 5,535,403 | 7/1996 | Li et al. | 395/800 |

(List continued on next page.)

FOREIGN PATENT DOCUMENTS 0 609 990 A2   8/1994   European Pat. Off. .

OTHER PUBLICATIONS

Mier et al., "PC–Based Ware Bests Unix Systems: The NAT NMS/100's Price Performance Earns it a Higher Grade Overall than Huges' Monet and Network Managers' NMC 3000", CommunicationsWeek, pp. 51, Apr. 1993.

"Users Can Pay a Lot for a Little—SNMP Management Systems from . . . ", Communications Week, Feb. 8, 1993.

"OpenView Manager Outshines Sum—HP's SNMP System Takes the Leas with Six . . . ", Communications Week, Mar. 22, 1993.

(List continued on next page.)

*Primary Examiner*—Thomas G. Black
*Assistant Examiner*—Charles L. Rones
*Attorney, Agent, or Firm*—Wolf, Greenfield & Sacks, P.C.

[57] ABSTRACT

Apparatus and method for monitoring parameters that govern the operational characteristics of a network device, including the use of templates for generating configuration records of network devices of a selected model type. A database of models is provided, each model representing an associated network device and including attribute values for the parameters of the associated network device. Templates are used to screen a model in order to retrieve values for each of the attributes and create a configuration record. The configuration records may be stored in the configuration manager or other storage device, and/or transferred to the pre-existing model database for use by a network management system in reconfiguring the associated network devices. This system for configuration management is less time consuming, expensive, and error prone than prior systems.

22 Claims, 6 Drawing Sheets

U.S. PATENT DOCUMENTS

| | | | |
|---|---|---|---|
| 5,539,870 | 7/1996 | Conrad et al. | 395/155 |
| 5,552,995 | 9/1996 | Sebastian | 364/468.03 |
| 5,559,955 | 9/1996 | Dev et al. | 364/182.02 |
| 5,559,958 | 9/1996 | Farrand et al. | 395/183.03 |
| 5,568,605 | 10/1996 | Clouston et al. | 395/182.02 |
| 5,572,652 | 11/1996 | Robusto et al. | 395/326 |
| 5,581,749 | 12/1996 | Hossain et al. | 395/610 |
| 5,611,059 | 3/1997 | Benton et al. | 395/326 |

OTHER PUBLICATIONS

"Cabletron to Unveil Enhanced, Cheaper Version of Spectrum", Communications Week, Mar. 30, 1992.

Spectrum–Netvisualyzer Duo–Its Net Mgm't Deal', Communications Week, Jun. 10, 1991.

"NetLabs Manager Edges Out IBM—In Series Fianle, Trap–Management Features . . . ", Communications Week, Jun. 21, 1993.

"Cabletron Launches Spectrum 2.0 Network Manager", ComputerGram International, Sep. 8, 1993.

Cheriton et al., "Host Groups: A Multicast Extension For Datagram Internetworks," Data Communications Symposium, Sep. 1985, pp. 172–179 (USA).

"Method For Assigning Network Applications To Users and Groups," IBM Technical Disclosure Bulletin, vol. 37, No. 4b, Apr. 1994 (New York, USA).

Terplan, Communications Networks Management "Configuration Management,"(Chapter 7, pp. 199–262), Second edition, Prentice Hall, Englewood Cliffs, New Jersey 07632 (1992).

Sloman, Network and Distributed Systems Management, Addison–Wesley Publishing Company, Wokingham, England (1994), "Domains: A Framework For Structuring Management Policy" (Chapter 16, pp. 433–453), Moffett, Specification of Management Policies and Discretionary Access Control, (Chapter 17, pp. 455–480), Magee, Configuration of Distributed Systems, (Chapter 18, pp. 483–497).

Ericson et al., Expert Systems Applications In Integrated Network Management, "Configuration Management Applications," (Chapter 3, pp. 151–192), Artech House, 685 Canton Street, Norwood, MA 02062 (1989).

Weis, Journal of Network and Systems Management, Plenum Publishing Corp., "Policies In Network And Systems Management—Formal Definition And Architecture," Plenum Publishing Corp., (1994).

Roos et al., Integrated Network Management III, "Modelling Management Policy Using Enriched Managed Objects," Elsevier Science Publishers, North holland, pp. 207–215 (1993).

```
09:30 AM WED JAN 26 1994                    PAGE 1
             SPECTRUM CONFIGURATION MANAGER

TEMPLATE LISTING FOR NEW_CONFIG_TEMPLATE

ATTRIBUTE

AT_IF_INDEX
  AT_NET_ADDR
  AT_PHYS_ADDR
  APPS_CREATED_STATE
  AUTOPLACEOFFSETX
  AUTOPLACEOFFSETY
  AUTOPLACESTARTX
  AUTOPLACESTARTY
  COMMUNITY_NAME
  CONDITION
  CONDITION_VALUE
  CONTACTPERSON
  CONTACT_STATUS
  DATARELAYCLASS
  DESC_KEY_WORD
  DEV_CONTACT_STATUS
  DEVICETYPE
  DEVICE_NAME
  DEVICE_TYPE
  DISPOSABLE_PRECEDENCE
  EDIT_COUNT
  GENERALDISCCLASS
  SYSNAME
  SYSTEM_OID_VERIFY
  SYSTEM_UP_TIME
  TIMEOUT
  TRYCOUNT
  VIB_DISPLAY_LIST
  VIB_RASTER_NAME
  VALUE_WHEN_ORANGE
  VALUE_WHEN_RED
  VALUE_WHEN_YELLOW
  ZOOM_FACTOR
  ATTR_TO_READ
```
~40

TEMPLATE

```
09:24 AM WED JAN 26 1994                          PAGE 1
              SPECTRUM CONFIGURATION MANAGER

CONFIGURATION LISTING FOR NEW_CONFIG
  ATTRIBUTE                          VALUE

AT_IF_INDEX.2.1.132.177.141.10    2
  AT_NET_ADDR.2.1.132.177.141.1     86.8D.8F.1
  AT_PHYS_ADDR.2.1.132.177.141.1    0.0.C.4.E.3.63
  APPS_CREATED_STATE                1
  AUTOPLACEOFFSETX                  0
  AUTOPLACEOFFSETY                  30
  AUTOPLACESTARTX                   100
  AUTOPLACESTARTY                   50
  COMMUNITY_NAME                    PUBLIC
  CONDITION                         6
  CONDITION_VALUE                   0
  CONTACTPERSON                     LISA
  CONTACT_STATUS                    2
  DATARELAYCLASS                    4
  DESC_KEY_WORD                     8.2(4):8.2(5)
  DEV_CONTACT_STATUS                2
  DEVICETYPE                        CISCOMIM
  DEVICE_NAME                       <NO VALUE>
  DEVICE_TYPE                       <NO VALUE>
  DISPOSABLE_PRECEDENCE             10
  EDIT_COUNT                        1
  GENERALDISCCLASS                  1
  SYSNAME                           ENAX
  SYSTEM_OID_VERIFY                 1.3.6.1.4.1.9.1.5
  SYSTEM_UP_TIME                    180337411
  TIMEOUT                           3000
  TRYCOUNT                          3
  VIB_DISPLAY_LIST                  0.0.0.0.6D.73.0.F8
  VIB_RASTER_NAME                   DEFAULT.CSI
  VALUE_WHEN_ORANGE                 3
  VALUE_WHEN_RED                    7
  VALUE_WHEN_YELLOW                 1
  ZOOM_FACTOR                       100
  ATTR_TO_READ                      230006
```
42

CONFIGURATION

FIG. 3

METHOD AND APPARATUS FOR CONFIGURATION MANAGEMENT IN COMMUNICATIONS NETWORKS

FIELD OF THE INVENTION

The present invention is directed to configuration management of communications networks, and more specifically to an apparatus and method for processing and storing model-based configuration data and which utilizes templates for configuring a plurality of network devices in order to make such configuration management less time-consuming, expensive and error prone.

BACKGROUND OF THE INVENTION

Configuration management in communications networks is the task of keeping an inventory of network devices, knowing the configuration of each device, resetting or updating configurations as the need arises, and scheduling configuration changes. In the past, many of these tasks were done manually or by software packages built specifically for a particular device.

A "configuration" is defined as a particular setting of device parameters that govern the operational characteristics of a network device. In communications networks, the devices that are routinely configured are routers, bridges and hubs, and examples of device parameters include port thresholds, on/off switches, access security, etc.

In the prior art, one method of network configuration is to manually configure a network device. In this case, a user physically attaches a dumb terminal to the network device and issues configuration commands through the terminal's keyboard. A disadvantage of this method is that one cannot retrieve or store information regarding the configuration of a device.

A second known method is to make configuration changes with a software package built specially for a network device type. A disadvantage of this method is that one cannot configure different device types simultaneously. Examples of commercially available tools that allow one to configure a single type of device include the following: (1) SITE MANAGER, WELLFLEET COMMUNICATIONS, INC., 8 Federal Street, Billerica, Mass. 01821; and (2) CISCO WORKS, CISCO SYSTEMS, INC., 1525 O'Brien Drive, Menlo Park, Calif. 94025.

Thus, the primary disadvantages of the prior art include:

a user can manually configure only one device at a time;

a user must know the desired configuration before making a change;

a user must manually check to see if in fact the desired change took place;

existing tools utilize only one network management protocol (e.g., the simple network management protocol—SNMP) to manage the device; and existing tools are specialized for one particular type of device (e.g., CISCO routers).

In general, the prior art methods are time-consuming, expensive, error prone, and limited in terms of the operations that can be performed.

SUMMARY OF THE INVENTION

The present invention is directed to a method and apparatus for configuration management of a communications network, and which performs one or more of the following functions:

enables configuration of several network devices at the same time;

enables retrieval of a configuration from a device, storage of a configuration, and downloading of the configuration to other devices;

verifies that configurations have taken place and generates reports and/or alarms when configuration operations are unsuccessful;

enables automatic scheduling of configuration retrieval, loading and/or verification;

enables configuration of a wide variety of different network devices.

The present invention utilizes a database of models, each "model" representing an associated network device and including attribute values for the parameters of that device. A configuration manager accesses a set of model types, each "model type" having an associated set of attributes. The configuration manager creates a template by selecting a model type and one or more attributes from the associated set of attributes, and then screens a selected model with the template to retrieve the values for each of the attributes in the template from the attribute values in the database, to create a configuration record for the model. The configuration record may then be stored, modified, transferred to a model, and/or displayed to a user on a user interface. Also, multiple templates can be used to create a composite configuration record. Multiple configuration records may be transferred to multiple models in the database, for reconfiguring multiple network devices. In one alternative embodiment, a template may be created from a pre-existing configuration record by extracting the attributes of that record. Other features include the generation of alarms to indicate whether or not a transfer or reconfiguration has been successful, and maintaining a scheduler for automatic capture, load or verification of configuration records.

The terms "model" and "model type" will be more specifically described in regard to the following detailed description. Generally, a model type is analogous to a "class" in object-oriented terminology. Note that a reference to "model type name" is meant to be the same as "model type".

The term "model" is analogous to an "instance of a class" or an "object" in object-oriented terminology. So, a model is an instance of a model type. Again, a reference to "model name" means the same as just "model".

These and other advantages of the present invention are both particularly described in the following detailed description and drawings.

BRIEF DESCRIPTION OF THE DRAWINGS

FIG. 3 illustrates a representative template and a corresponding configuration according to the present invention.

DETAILED DESCRIPTION

In accordance with a specific embodiment of the present invention, configuration management may include identifying, controlling and monitoring the "managed devices" that make up a communications network. A managed device is any device that is modeled in a network management system, such as the SPECTRUM NETWORK MANAGEMENT SYSTEM available from CABLETRON SYSTEMS, INC., 35 Industrial Way, Rochester, N.H. 03867. The managed devices include not only hardware devices such as personal computers (PCs), workstations, hubs and routers, but also software applications.

Figure 1:
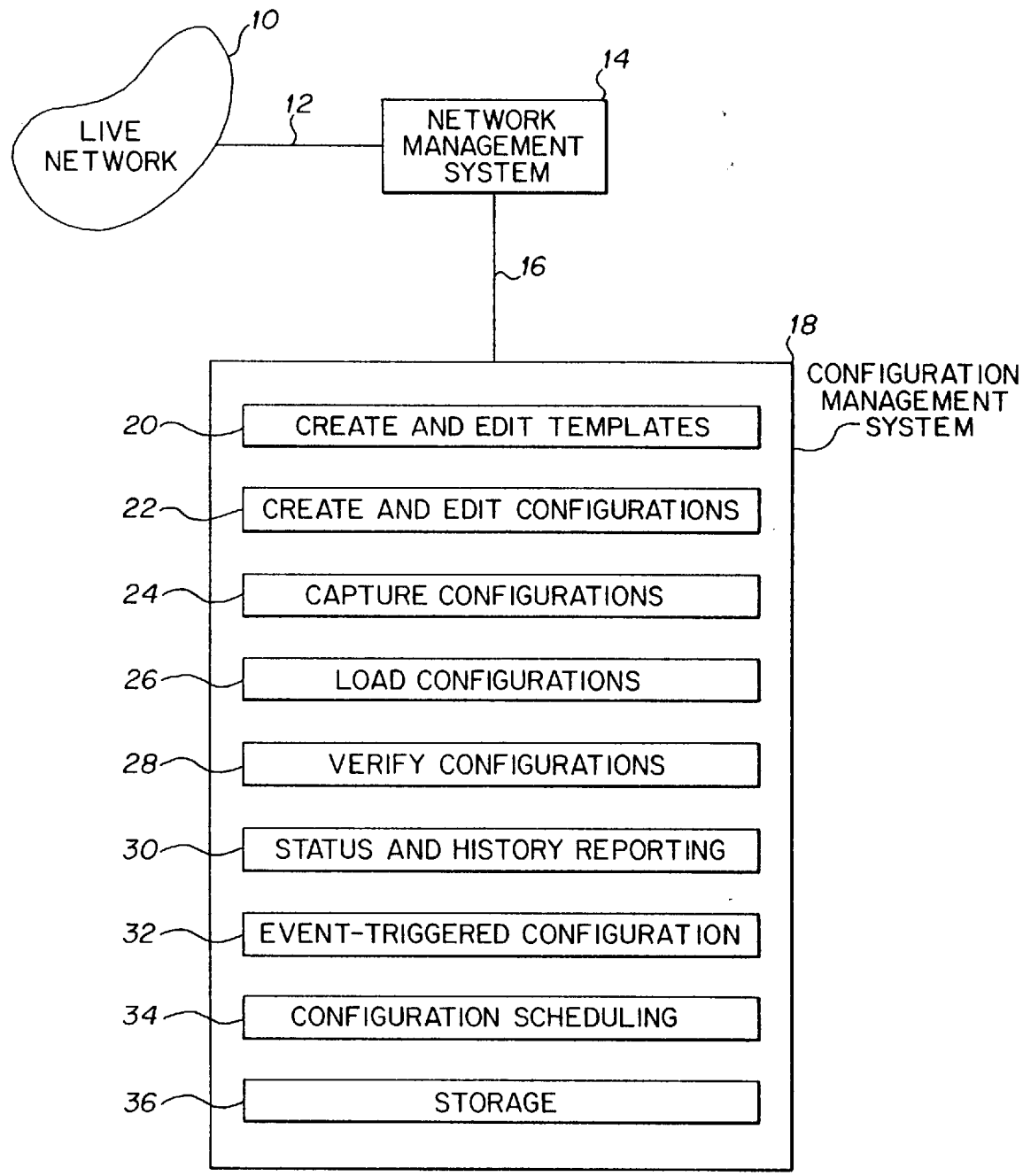
FIG. 1 is a schematic illustration of one embodiment of an apparatus for configuration management according to this invention.

As illustrated in FIG. 1, a network management system 14, such as SPECTRUM, continually monitors the network and maintains a database of information about every managed device in the network. In accordance with this invention, a configuration manager 18 obtains the values of certain attributes (i.e., data which define the characteristics of the network device being modeled) in a desired configuration by interrogating the SPECTRUM model of the managed device. The configuration manager then enables a system administrator, via a user interface (see FIG. 2), to use this information to manage the device. For example, the administrator may create new configurations, load these configurations to devices anywhere on the network, and then verify whether the configurations have changed.

More specifically, the configuration manager enables a user to create configurations with a template. A template is a list of attributes for a device of a certain model type. When creating a template, the configuration manager provides the user with a list of all readable/writable and non-shared attributes for a model type (which includes the specific device). The user then selects the attributes needed for the template, which depending on the purpose of the template, might include a single attribute (port status, for example) or dozens of attributes.

The configuration manager then captures the values of the attributes listed in the template, by retrieving the values from the SPECTRUM model. The template functions like a filter, blocking out unwanted attributes (IP address, for example) and capturing the values of those attributes found in the template.

The resulting configuration created with the template contains the attributes from the template and the values collected from the model. The configuration may be stored in the configuration manager, in another storage device, or the SPECTRUM database.

FIG. 3 illustrates the difference between a template and a configuration. Item 40 is a template for "new_config template" which includes the list of attributes set forth below the heading "Attribute". Item 42 is the corresponding configuration for "new_config", which includes a list of attributes on the left and corresponding values on the right.

The following glossary of terms is helpful to an understanding of the present invention:

capture: An operation on a model that stores all attribute/value pairs, obtained by interrogating the selected models through a template. That is, the value of only those attributes that can be found within the template are obtained by interrogating the model.

configuration: A record of all attribute/value pairs which are obtained by interrogating the selected models through the template. The record may be stored in a compressed form in the configuration manager.

load: An operation on a model which places the values of the attributes listed in the selected configuration into selected models.

template: A record which contains a list of attributes for which the configurations will provide values.

verify: An operation on a model which involves comparing the model's actual attributes/values with the attribute/value pairs of a configuration.

attribute: A configurable parameter within a model. The development of the model type creates an attribute by publishing the attribute name and range of possible values.

An understanding of the present invention is furthered by an understanding of a model-based network management system such as Spectrum™, which is described in U.S. Pat. No. 5,261,044, issued Nov. 9, 1993 to R.Dev et al., and hereby incorporated by reference in its entitety. The SPECTRUM network management system is commercially available and also described in various user manuals and literature available from CABLETRON SYSTEMS, INC., Rochester, N.H.

In summary, SPECTRUM is a system for maintaining and processing information pertaining to the condition of the computer network and providing the same to a user, the network including a plurality of network entities such as computer devices and software applications being executed on such devices. The system includes a virtual network machine, comprising a programmed digital computer, wherein a program is implemented using an object-oriented programming language such as C++, Eiffel, SMALLTALK, and Ada. The virtual network consists of interrelated intelligent models of network entities and relations between network entities, including means for acquiring network data pertaining to the condition of a network entity from the corresponding network entity. The virtual network further includes means for maintaining objects which include network data relating to the corresponding network entity and one or more inference handlers for processing the network data, the inference handlers being responsive to changes occurring in the same and/or a different object. The network data can then be transferred to a user interface coupled to the virtual network machine, for supplying the network data to a user.

Thus, the models are implemented as software "objects" containing both "data" (attributes) relating to the corresponding network entity and one or more "inference handlers" (functions) for processing the data. See Grady Booch, "Object-Oriented Analysis And Design, With Applications," 2nd Edition, Benjamin/Cummings Publishing Co., Redwood City, Calif., Chapter 2, 1994. The inference handlers are initiated by predetermined virtual network events, such as a change in specified network data in the same model, a change in specified network data in a different model, and predefined events or changes in models or model relations. Information pertaining to the condition of the network entity can be obtained from the network entity by polling the same, can be automatically received from the network entity (without polling), or can be inferred from data contained in other models. An alarm condition may be generated when the network data meets a predetermined criteria. Events, alarms and statistical information from the virtual network are stored in a database and are selectively displayed for the user.

The data in the SPECTRUM database may be used for generating topological displays of the network, showing hierarchial relationships between network devices, isolating a network fault, and reviewing statistical information.

SPECTRUM allows for collective management of autonomous local area networks (LANs), with equipment from different vendors. It complies with the current simple network management protocol (SNMP) standards, and can also accommodate other standard and proprietary protocols. The virtual network machine preprocesses the raw information coming from the network devices in order to construct a model of the network's current status and performance characteristics. Network elements that cannot be directly communicated with (e.g., cables and buildings) can infer their status from the status of the devices connected to (or contained within) them. The virtual network machine provides a consistent interface for management applications to access any of the information in the model and thereby provides these applications with a unified view of the network.

SPECTRUM associated SPECTROGRAPH user interface provides a highly graphical multi-perspective view into the network model. SPECTROGRAPH enables the user to navigate through a landscape in which cables, networks, local area networks and even rooms show up as icons, and which icons indicate the health and performance characteristics of those elements. These icons can be further queried for additional information. SPECTROGRAPH main function is to visually present to the user the model within the virtual network machine. It allows the user to navigate freely within the network model, only limited by the access rights assigned by the network administrator. The information can be accessed at varying degrees of detail, from a macro overview, to the devices and cables which connect them. In addition to its navigation functions, SPECTROGRAPH provides an alarm management facility, an event log window, a reporting facility, a find facility, and other features.

The above description of the SPECTRUM system provides a context for an understanding of the present invention. As described in greater detail below, the configuration manager of the present invention utilizes certain aspects of the SPECTRUM system to provide a configuration management system which is less time-consuming, expensive and error prone.

FIG. 1 is a block diagram illustrating generally the method and apparatus of the present invention. A network management system 14 monitors a live network 10 via communication link 12. In this example, the network management system is SPECTRUM, which includes a database of models and model types relating to corresponding network entities. A configuration management system 18 is connected via communication link 16 to the network management system 14. In this embodiment, the configuration management system 18 is software implemented in an object-oriented programming language such as C++, and developed on a SUN OS platform. The configuration management system may be envoked from an icon subview menu within the SPECTROGRAPH user interface, which forms part of networking management system 14.

The configuration management system 18 according to the present invention includes the following features/functions:

create and edit templates 20:
create and edit configurations 22;
capture configurations 24;
load configurations 26;
verify configurations 28;
status and history reporting 30;
event-triggered configuration 32;
configuration scheduling 34; and
storage 36.

These features/functions will be described in greater detail below.

Figure 2:
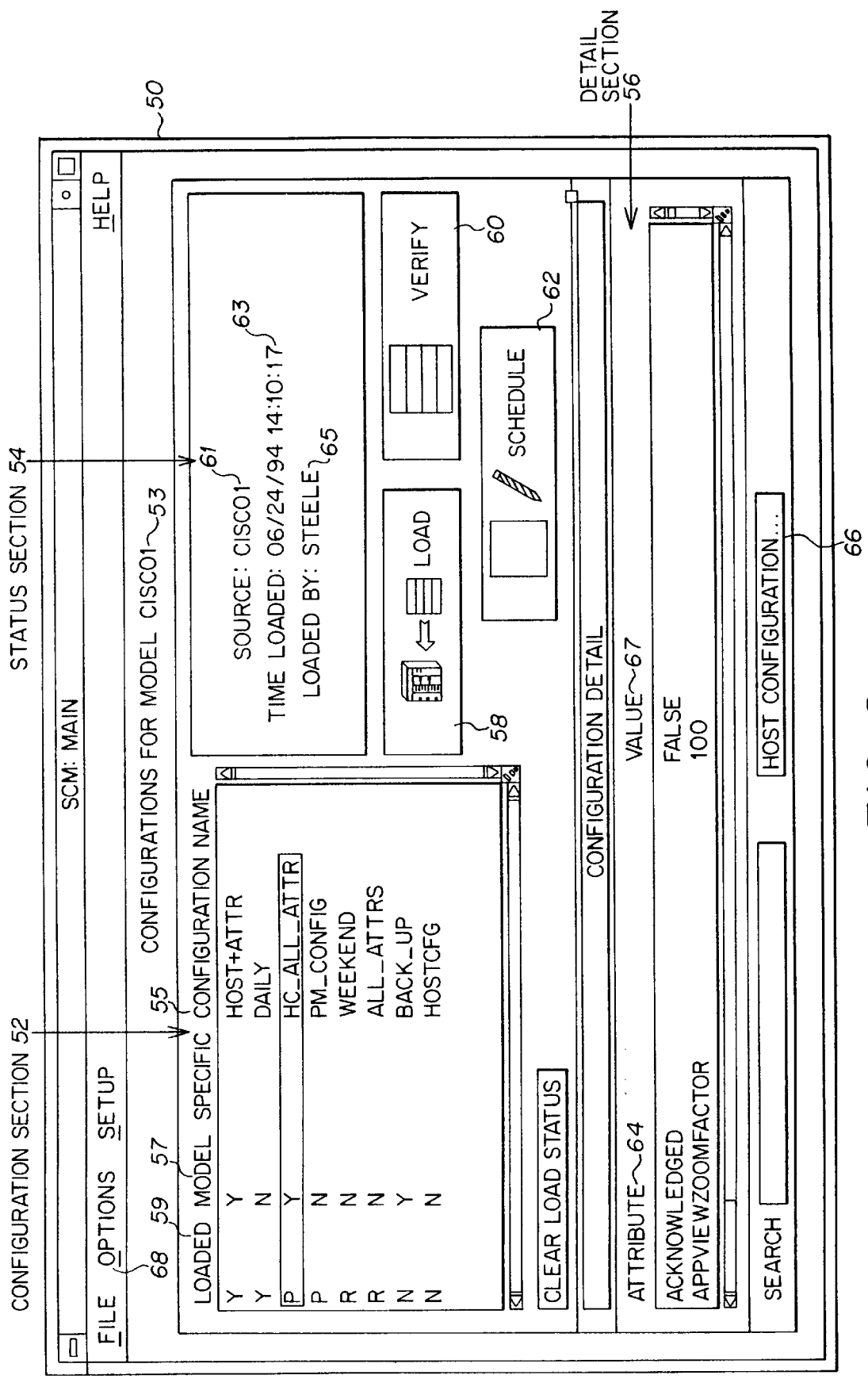
FIG. 2 is a main window display from a user interface illustrating the configuration data and options which may be selected according to one embodiment of this invention.

FIG. 2 illustrates the main display screen for the configuration management system as displayed on SPECTROGRAPH. The display 50 includes a configuration section 52 which lists the available configurations by name and information about the selected configuration in other fields. These configurations all relate to the model "Cisco 1" (i.e., a type of CISCO router) previously selected by the user, as indicated on the display. The configurations listed in section 52 can be loaded to the selected model or to other models of the same model type, and further to schedule automatic loads as described below. The load and schedule operations are initiated by selecting the icons 58 and 62, respectively. The verify operation, designated by icon 60, enables the user to verify the configuration of the selected model or models, and also to schedule automatic verifications as described below.

The "Configuration Name" field 55 contains the names of configurations that have previously been created for models of the same model type as the model selected by the user (as shown in line 53). The "Model Specific" field 57 shows whether the configuration is specific to this model or whether it will be included in the configuration list of other models of the same type. The "Loaded" field 59 shows the most recent load status of the configuration, for example: y=successful, n=not loaded, p=partially loaded, and r=rolled back. These will be further defined below.

The status section 54 includes a "Source" field 61 containing the name of the model from which the configuration was captured. The "Time Loaded" field 63 indicates the last date and time the configuration was loaded. The "Loaded By" field 65 designates the log-in name of the person who loaded the configuration.

The detail section 56 displays information about the attributes that are in the selected configuration. This enables the user to view the attributes in the configuration before the user elects to load the configuration to a model. The "Attribute" field 64 contains a list of attributes in the configuration and their instance IDs, if any. The "Value" field 67 contains the values of the attributes, which can be numbers or text strings.

The "Host Configuration" button 66 at the bottom of the window provides the user with the additional options of viewing, editing, printing and loading a host configuration, as opposed to a SPECTRUM configuration. For example, the host configuration file on a CISCO router contains the setup commands used to configure that router. When a user captures or creates a CISCO router configuration, the host configuration button appears at the bottom of the display. This enables a user to perform all of the configuration management operations on the CISCO host configuration. CISCO router is a trademark of CISCO SYSTEMS, INC., Menlo Park, Calif.

Figure 4:
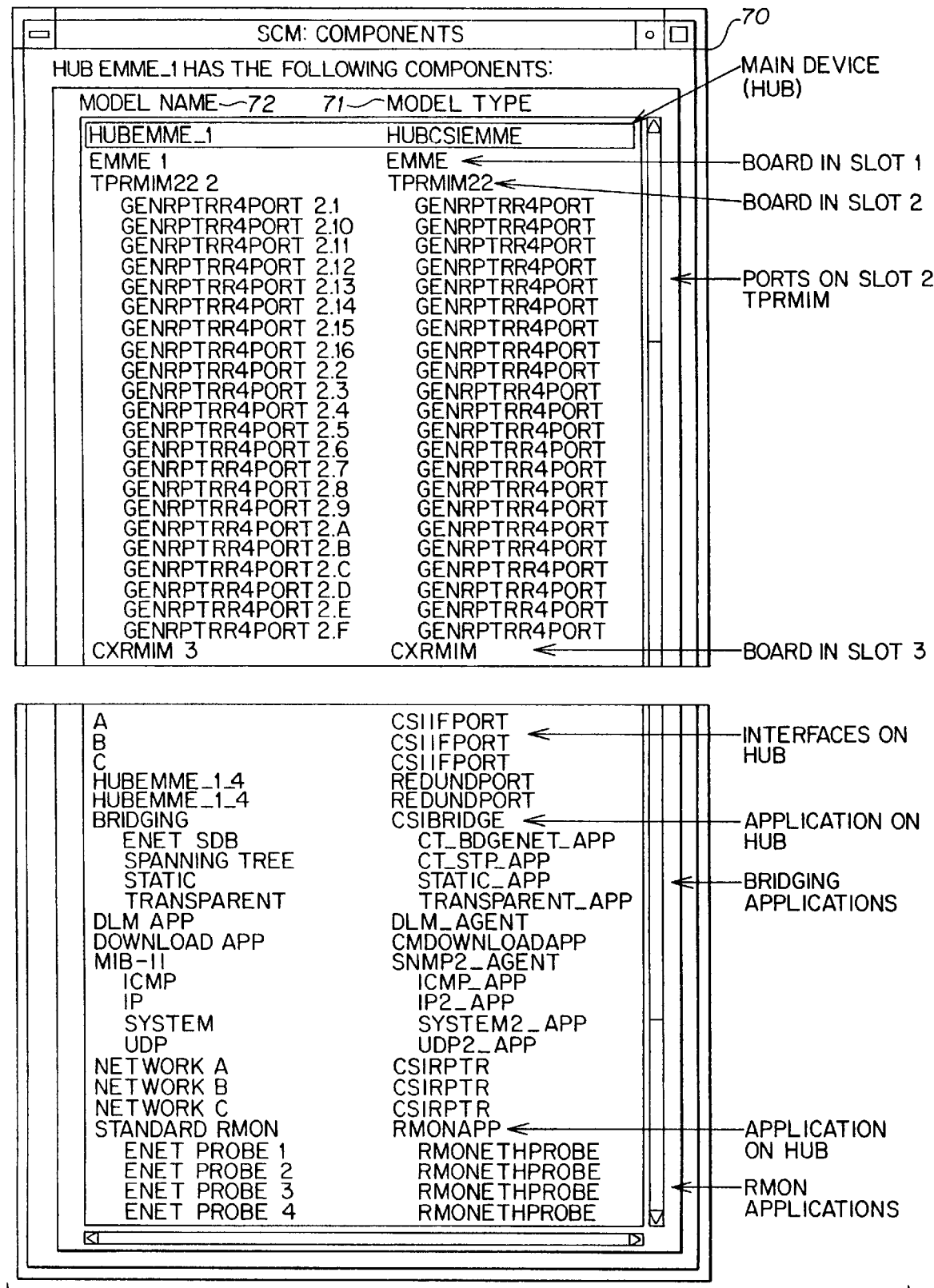
FIG. 4 is a components window display outlining the components of a main network device (e.g., hub), showing model name and model type according to one embodiment of this invention.

The display screen illustrated in FIG. 4 is a components display 70. This screen is under the "Options" menu 68 on the main display screen (FIG. 2). In FIG. 4, a user has selected the components for "HubEmme_1" and display 70 lists all components according to their relationship to the main device. The main device (HubCSIEMME—a hub sold by CABLETRON SYSTEMS, INC.) appears at the top of the right-hand list under the heading "Model Type" 71, and all components of this main device, for example, boards, interface and applications, appear below the main device. All subcomponents appear indented under the component. On the left-hand side, under the column heading "Model Name" 72, are the specific instances of these components. For example, FIG. 4 illustrates that the main device has an Emme board in slot 1, a TPRMIM22 board in slot 2, and then lists all of the ports on slot 2. Following all of the boards, there are listed the interfaces on the hub and then the applications on the hub.

Figure 5:
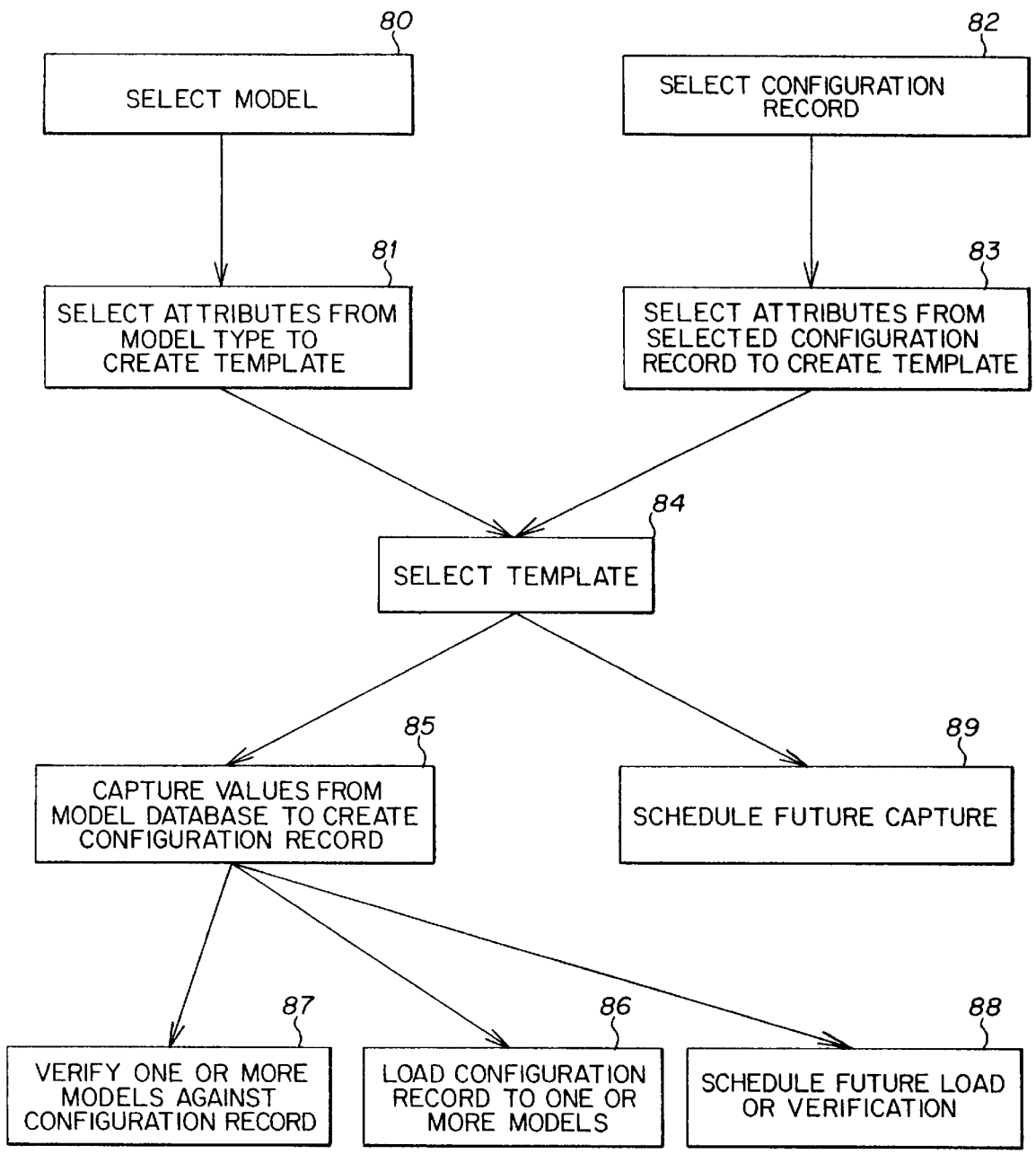
FIG. 5 is a flow chart of the basic configuration operations according to this invention.

The operation of the configuration management system will now be described in greater detail, with reference to the general flow chart of FIG. 5. A summary of FIG. 5 is outlined below, followed by a more detailed discussion:

Select Model (80)
    Connect to model database
    Display available model/modeltype pairs
    Highlight/check model of interest
Create template by selecting model type attributes (81)
    Retrieve all attributes from the related modeltype
    Highlight/check attributes of interest
    Save collection of attributes as a template
Select configuration record (82)
    Connect to configuration record database
    Display available configurations
    Highlight/check configuration of interest
Create template by selecting configuration attributes (83)
    Retrieve all attributes in configuration record
    Save collection of attributes as a template
Select template (84)
    Connect to template database
    Display available templates
    Highlight/check template of interest
Create configuration record (85)
    Connect to model database
    Use template as an index to retrieve attribute values
    Save collection of attribute/value pairs to configuration record database
Load configuration record (86)
    Connect to model database
    Display available models
    Highlight/check models of interest
    Place parameter values from configuration record into the model
Verify model(s) against configuration record (87)
    Connect to model database
    Connect to configuration data base
    Display available models
    Display available configurations
    Highlight/check models of interest
    Highlight/check configuration of interest
    Report discrepancies between attribute/value pairs after comparison
Schedule future load or verification (88)
    Connect to configuration record database
    Display available configurations
    Highlight/check configuration of interest
    Schedule loads or verifications
Schedule future capture (89)
    Connect to template database
    Display available templates
    Highlight/check templates of interest
    Schedule captures The configuration manager allows the user to create configurations in two ways—either with templates or manually without templates. During both processes, the configuration manager captures attribute values and instance IDs, if any, from the selected model. The capture process provides an efficient way to "populate" a configuration, reducing the chances of human error. The user can then modify attribute values and instance IDs when necessary.

The configuration manager allows the user to create the following types of configurations:

configurations that can be loaded to the model selected by the user, or to other models of that model type.

model-specific configurations that are restricted to one device and cannot be loaded to other devices. When the model specific option 57 (FIG. 2) is selected for a configuration, the configuration manager displays the configuration only in the configuration listing of the specified device.

multiple configurations that can be loaded sequentially to a single device. For example, a user may create multiple configurations when it is necessary to configure certain attributes before configuring others, or when configurations are very large.

Once a configuration is created, the user can use the load and verify options. The load option enables the user to load the configuration to the model from which it was captured or to one or more models of the same type. This is how one configures new models or reconfigures existing ones. The verify option enables the user to verify whether models' attribute values match that of the configuration created.

Managing Templates

Templates are useful to create configurations quickly. A library of templates provides administrators with an efficient way to create configurations.

A template is created by selecting a model (step 80) and then selecting one or more attributes of the model type of the selected model (step 81). The template can later be edited by adding to or deleting selected attributes.

An alternative method (steps 82–83) of creating a template is from a configuration that has been created manually, or captured with the template and then modified. In this case, the configuration manager takes the attributes listed in the configuration, creates a template from them, and gives the template the same name as the configuration.

ManagingConfigurations

A user first selects the desired template (step 84). The configuration manager then uses the template to capture the values of those attributes specified in the template and lists the captured attribute/value pairs in a new configuration (step 85). The configuration manager captures all instances of an attribute, where applicable. The template thus functions as a filter, blocking out unwanted attributes and capturing the values of those attributes specified in the template. Some attributes—IP address, for example, should not be captured in a configuration that will be applied to multiple devices. Therefore, the template used to capture this configuration should not include the IP address attribute.

When creating a configuration with a template, the configuration manager only includes in the configuration those attributes that can be retrieved from the model. If the configuration manager cannot capture attributes specified in the template, it shows the user the attributes that were not captured. The user can then insert those attributes and values by editing the configuration later, if necessary.

Loading a Configuration

Once a configuration is created either manually or with the template, the user can load the configuration to one or more models (step 86). As a first alternative, the configuration manager will apply a configuration to the selected model; as a second alternative, the configuration manager will apply a configuration to any number of models of the same model type as the selected model.

A "safe load" option helps administrators control the load process. When the safe load option is activated, the configuration manager captures the model's configuration before loading a new configuration to it. If the load fails, the configuration manager tries to restore (i.e., roll back) the original configuration to the model.

The configuration section 52 in the main window 50 (FIG. 2) shows the load status of the configurations which have been created. Successfully loaded configurations (Y) appear first, then partially loaded configurations P, then rolled-back configurations (R). Within these three subcategories, configurations are sorted according to the time of the load, the most recent load appearing first. Configurations that have not been loaded (N) are sorted according to the time they were created—the most recently created appearing first. Configurations that have not been loaded (N) are sorted according to the time they were created—the most recently created appearing first.

Once a configuration record is loaded to the model, the network management system 14 will modify the parameters of the network device to conform to the configuration data in the model.

Verifying a Configuration

To perform a verification (step 87), the configuration manager first captures the actual configuration of the model and compares each attribute/value pair in the configuration with the current model's actual configuration. The configuration manager may then display the results to a user via the user interface.

In addition, the configuration manager enables the user to verify the configurations of other models of the same model type as a selected model, by creating a sublist of the models in for example, a particular network or area.

Scheduling Tasks

The configuration manager enables administrators to schedule (steps 88 and 89) the time and frequency of automatic captures, loads and verifications. More specifically, this feature may be used to:

schedule loads, captures and verifications during low-traffic hours.

maintain more stable configurations by scheduling automatic loads at regular intervals.

check the integrity of the network with periodic, automatic captures and verifications of configurations.

The configuration manager sends information about the scheduled operations to the SPECTRUM event log and/or to other storage devices. A user can then view the results of any operation performed by the scheduler.

For example, to schedule a capture, the user will specify the template to be used and the name of the configuration that is created. Then, the user selects a frequency option (hourly, daily, once, weekly, monthly). The scheduled entry is then sent to a scheduling queue.

The event log, which is accessed in SPECTROGRAPH, contains the basic information about each configuration operation. An event log entry shows the time the operation was performed, whether it was successful, and the names of the devices, configurations, and templates when applicable.

The following example is illustrative of the above-described methods.

Example: Configuring Ports

The procedures in this example show how the configuration manager may be used to configure ports (i.e., turn on or off) on an "MRXiRptr" repeater. The example assumes that the MRXiRptr is located in slot 2 of a hub and that the ports are all on.

Figure 6:
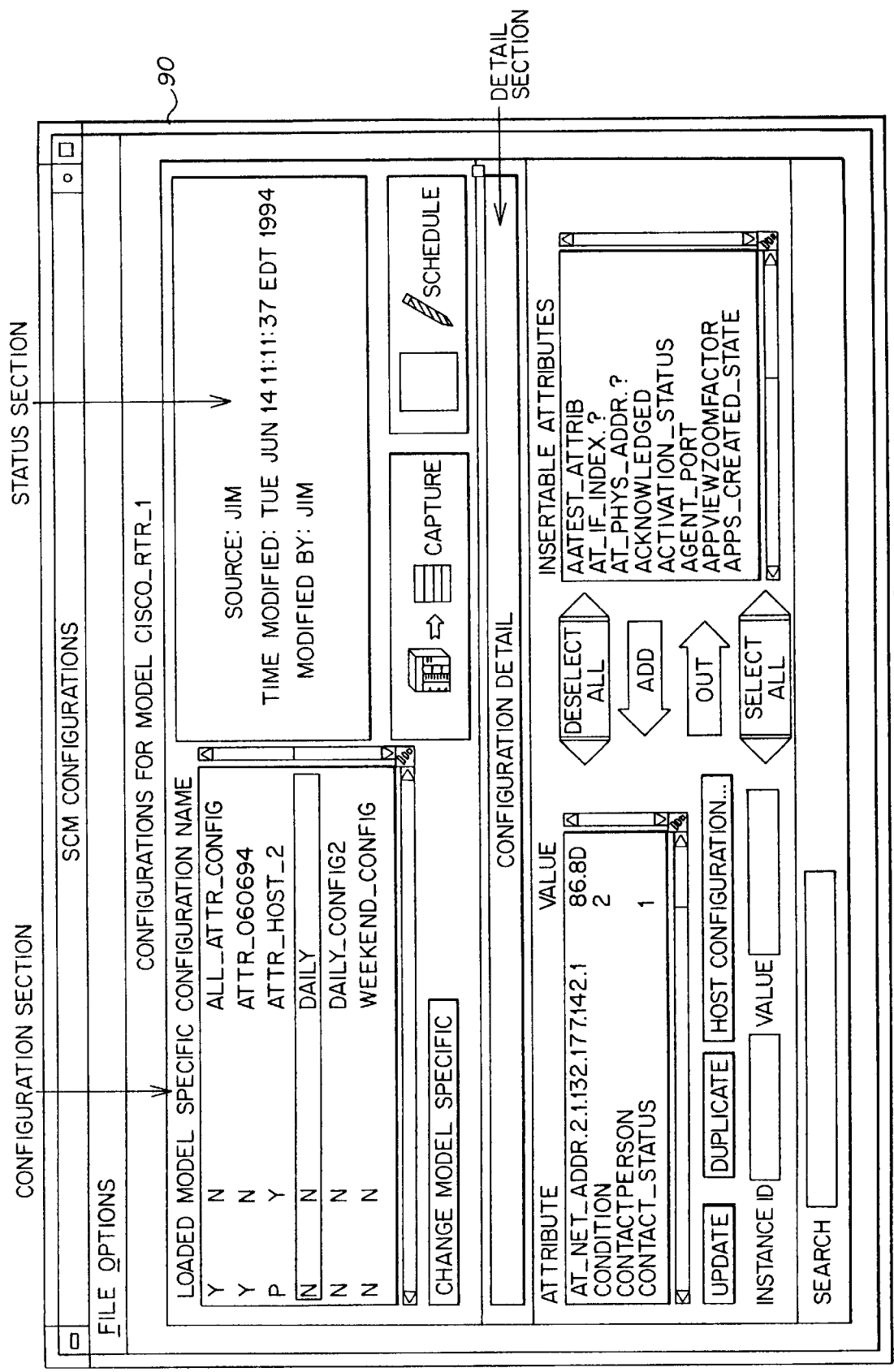
FIG. 6 is a configuration window display for managing configurations according to this invention.

1. In SPECTROGRAPH, select an icon of a hub that contains an MRXiRptr and invoke the configuration manager from it.
2. Navigate to the specific component that you want to work with—in this case, an MRXiRptr. Follow these steps:
   a. In the Main window 50 (FIG. 2), click on Navigate Components in the Options menu 68. This opens a Components dialog box (FIG. 4).
   b. Scroll down through the list of components in the Components dialog box, select the MRXiRptr, and click on Apply.
   c. Close the Components window. The Main window 50 now displays all the configurations that are available to the MRXiRptr.
   d. Open a Configurations window 90 (FIG. 6).
3. In the Configurations window (FIG. 6), manually create a configuration called "Ports1__2__OFF." When completed, the configuration should have the following attributes, instance IDs, and values:

| Attribute | Value |
| --- | --- |
| rptrPortMgmtAdminState 2.1 | 1 |
| rptrPortMgmtAdminState 2.2 | 1 |
| rptrPortMgmtAdminState 2.3 | 2 |
| rptrPortMgmtAdminstate 2.4 | 2 |
| . | . |
| . | . |
| . | . |

The instance IDs (2.1,2.2, 2.3, 2.4 . . . ) indicate that this board is located in slot 2 and that there are 4+ports on the board.

For this particular attribute, a value of 1 means OFF, a value of 2 means ON. Therefore, this configuration will turn ports 1 and 2 off and ports 3 and 4 on.

4. In the Main window 50 (FIG. 2), select the configuration "Ports1__2__OFF" (in section 52), and click on Load 58.

The configuration manager loads the configuration to the MRXiRptr. If a user keeps the Spectrum™ Device View open, he/she can see the ports 1 and 2 turn blue (off) when the configuration is downloaded.

Having thus described various embodiments of the present invention, additional modifications and improvements will readily occur to those skilled in the art. Accordingly, the foregoing description is by way of example only, and is not intended to be limiting.

What is claimed is:

1. A method for creating a configuration record for a network entity on a computer network, the configuration record having configuration management information for the operation of the network entity, the method including the steps of:

selecting a model type and desired attributes for creating a configuration management template for setting a desired operation of the network entity;

selecting values for the desired attributes to create the configuration record; and storing the configuration record for at least one model associated with the selected model type.

2. A method as claimed in claim 1, further including the steps of:

comparing actual model attribute values with configuration record attribute values; and generating an alarm when the comparing step determines the values are not the same.

3. A method as claimed in claim 1, wherein creating a template includes selecting the model type and desired attributes from a pre-existing configuration record.

4. A method as claimed in claim 1, further including:

transferring the configuration record to a user interface; and displaying the configuration record on the user interface.

5. A method as claimed in claim 1, wherein the step of selecting values for the desired attributes includes using the template to retrieve values for the desired attributes from a model.

6. A method as claimed in claim 1, further including:

transferring the configuration record to the associated model and generating an alarm when the transferring step is unsuccessful.

7. A method as claimed in claim 1, further including:

transferring the configuration record to multiple associated models simultaneously.

8. A method as claimed in claim 1, further including:

verifying the configuration of a device by comparing the attribute values of the associated model and the configuration record.

9. A method as claimed in claim 1, further including:

modifying the parameters of an associated network device to be the same as the attribute values of the configuration record and generating an alarm when the modifying step is unsuccessful.

10. A method as claimed in claim 1, further including:

modifying the parameters of a plurality of associated network devices simultaneously to be the same as the attribute values of the configuration record.

11. A method as claimed in any one of claims 1–10, further including:

maintaining a schedule for initiating one or more of the selecting, comparing, creating, transferring, verifying and modifying steps.

12. A system for creating a configuration record for a network entity on a computer network, the configuration record having configuration management information for the operation of the network entity, the system comprising:

a database of models, each model representing a network entity and including configurable attributes, wherein each model has an associated model type; and a configuration manager for creating and storing configuration records associated with a plurality of network entities, the configuration manager comprising:

means for creating a configuration management template for setting a desired operation of the network entity by selecting the model type and desired attributes;

means for creating a configuration record by selecting values for desired attributes in the configuration management template; and means for storing the configuration record for one or more models associated with the selected model type.

13. The system as claimed in claim 12, further including:

means for comparing the actual model attribute values with the configuration attribute values.

14. The system as claimed in claim 13, further including:

means for generating an alarm when the actual model attribute values are not the same as the configuration attribute values.

15. The system as claimed in claim 12, wherein the means for creating a template includes selecting the model type and desired attributes from a pre-existing configuration record.

16. The system as claimed in claim 12, further comprising:

a user interface for displaying the configuration record.

17. The system as claimed in claim 12, wherein the means for storing the configuration record further comprises:

means for transferring the configuration record to the associated model; and means for generating an alarm when the transferring is unsuccessful.

18. The system as claimed in claim 12, further including:

means for transferring the configuration record to multiple associated models simultaneously.

19. The system as claimed in claim 12, further including:

means for verifying a configuration of a device by comparing the attribute values of the associated model and the configuration record.

20. The system as claimed in claim 12, further including:

means for modifying the parameters of an associated network device to be the same as the attribute values of the configuration record; and means for generating an alarm when the modifying is unsuccessful.

21. The system as claimed in claim 12, further including:

means for modifying the parameters of a plurality of associated network devices simultaneously to be the same as the attribute values of the configuration record.

22. The system as claimed in any one of 12–21, further including:

means for maintaining a schedule for initiating one or more of the means for selecting, means for comparing, means for creating, means for transferring, means for verifying and means for modifying.

* * * * *